(12) United States Patent
Suleman et al.

(10) Patent No.: US 11,999,379 B2
(45) Date of Patent: Jun. 4, 2024

(54) SYSTEMS AND METHODS FOR CONTROLLING A WORK VEHICLE

(71) Applicant: CNH Industrial America LLC, New Holland, PA (US)

(72) Inventors: Yaseen Suleman, Glendale Heights, IL (US); Aditya Singh, Bolingbrook, IL (US); Andrew Berridge, Burr Ridge, IL (US)

( * ) Notice: Subject to any disclaimer, the term of this patent is extended or adjusted under 35 U.S.C. 154(b) by 195 days.

(21) Appl. No.: 17/395,104

(22) Filed: Aug. 5, 2021

(65) Prior Publication Data
US 2023/0039718 A1    Feb. 9, 2023

(51) Int. Cl.
*B60W 60/00*    (2020.01)
*A01B 69/04*    (2006.01)
*B60W 10/04*    (2006.01)
*B60W 10/20*    (2006.01)

(52) U.S. Cl.
CPC ....... *B60W 60/0011* (2020.02); *A01B 69/008* (2013.01); *B60W 10/04* (2013.01); *B60W 10/20* (2013.01); *B60W 2300/15* (2013.01); *B60W 2554/801* (2020.02); *B60W 2554/802* (2020.02); *B60W 2554/804* (2020.02); *B60W 2710/20* (2013.01); *B60W 2720/10* (2013.01)

(58) Field of Classification Search
None
See application file for complete search history.

(56) References Cited

U.S. PATENT DOCUMENTS

| | | |
|---|---|---|
| 6,148,255 A | 11/2000 | van der Lely |
| 6,169,940 B1 | 1/2001 | Jitsukata et al. |
| 6,216,071 B1 | 4/2001 | Motz |
| 6,732,024 B2 | 5/2004 | Wilhelm Rekow et al. |
| 8,160,765 B2 | 4/2012 | Morselli et al. |
| 8,306,727 B2 | 11/2012 | Morselli et al. |
| 8,437,901 B2 | 5/2013 | Anderson |
| 8,510,029 B2 | 8/2013 | Curtis et al. |
| 8,626,406 B2 | 1/2014 | Schleicher et al. |
| 8,639,408 B2 | 1/2014 | Anderson |
| 8,738,238 B2 | 5/2014 | Rekow |
| 8,868,304 B2 | 10/2014 | Bonefas |
| 9,061,590 B2 | 6/2015 | Kurumisawa et al. |
| 9,164,513 B2 | 10/2015 | Matsuzaki et al. |
| 9,448,561 B2 | 9/2016 | Fujimoto et al. |
| 9,526,199 B2 | 12/2016 | Matsuzaki et al. |

(Continued)

OTHER PUBLICATIONS

Evans, "Grain Harvest Logistics Modeling and Optimization of Single Harvester/ Grain Cart Operations", Dissertation, University of Nebraska, Oct. 2018, pp. 27-62 (Year: 2018).*

(Continued)

*Primary Examiner* — Tamara L Weber
(74) *Attorney, Agent, or Firm* — Rickard DeMille; Rebecca Henkel; Peter Zacharias

(57) ABSTRACT

An agricultural system includes a target vehicle configured to harvest crops and a work vehicle. The work vehicle includes a controller. The controller includes a memory and a processor, and the controller is configured to receive or determine a plurality of vehicle paths as well as a location of the target vehicle. The controller is also configured to identify an active path of the plurality of vehicle paths based on the location of the target vehicle. The target path is a path traversed by the target vehicle.

12 Claims, 5 Drawing Sheets

(56) References Cited

U.S. PATENT DOCUMENTS

| | | |
|---|---|---|
| 9,839,174 B2 | 12/2017 | Fujimoto et al. |
| 10,198,010 B2 | 2/2019 | Hiramatsu et al. |
| 10,219,422 B2 | 3/2019 | Buhler et al. |
| 10,254,765 B2 | 4/2019 | Rekow |
| 2012/0302299 A1* | 11/2012 | Behnke ............... A01B 69/008 701/50 |
| 2013/0231823 A1* | 9/2013 | Wang .................. A01B 69/008 701/32.4 |
| 2015/0285647 A1* | 10/2015 | Meyer zu Helligen ..................... A01B 79/005 701/533 |
| 2017/0192419 A1* | 7/2017 | Ray ........................ A01D 43/07 |
| 2020/0404846 A1* | 12/2020 | Fattey ................. A01B 79/005 |

OTHER PUBLICATIONS

Rahman et al., "Optimum harvesting area of convex and concave polygon field for path planning of robot combine harvester", Intelligent Service Robotics, Feb. 4, 2019, pp. 167-179 (Year: 2019).*

Xi Zhang; et al.; Development of an intelligent master-slave system between agricultural vehicles; 2010 IEEE Inteligent Vehicles Symposium, University of California, San Diego, CA, USA; Jun. 21-25, 2010; pp. 1-6.

* cited by examiner

SYSTEMS AND METHODS FOR CONTROLLING A WORK VEHICLE

BACKGROUND

The present disclosure generally relates to systems and methods for controlling a work vehicle.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest agricultural crops, such as cotton, wheat, flax, or other crops. Generally, components (e.g., drums, spindles, blades, etc.) of the harvester remove portions of the agricultural crop from the ground. The harvester then conveys the removed portions of the agricultural crop (e.g., agricultural products) to an internal storage compartment, either directly or via a processing device configured to remove undesirable portions of the agricultural products. As the harvester traverses a field, the volume of agricultural product stored within the internal storage compartment increases. Accordingly, the internal storage compartment is typically unloaded multiple times during the harvesting process. One method of unloading the internal storage compartment, generally known as unloading on-the-go, involves periodically transferring the agricultural product to a mobile storage compartment while the harvester is in motion. The mobile storage compartment is towed by a haul vehicle to a position proximate to the harvester to facilitate unloading. For example, certain haul vehicles include a control system configured to automatically direct the haul vehicle to a position that aligns the storage compartment with a conveyor outlet of the harvester. Once aligned, the agricultural product may be transferred from the harvester to the mobile storage compartment via the conveyor outlet, thereby unloading the internal storage compartment of the harvester.

During operation, the control system of the haul vehicle may receive heading, speed, and location data from the harvester. Using this information, the control system may determine a path for the haul vehicle to follow to align the storage compartment with the conveyor outlet. Unfortunately, the heading, speed, and location data of the harvester is often outdated by the time the haul vehicle receives the data. As a result, the haul vehicle path may be inaccurate, thereby resulting in multiple path redeterminations.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system includes a work vehicle controller. The controller includes a memory and a processor, and the controller is configured to receive or determine a plurality of vehicle paths as well as location data of the target vehicle. The controller is also configured to identify an active path of the plurality of vehicle paths based on the location of the target vehicle. The target path is a path traversed by the target vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
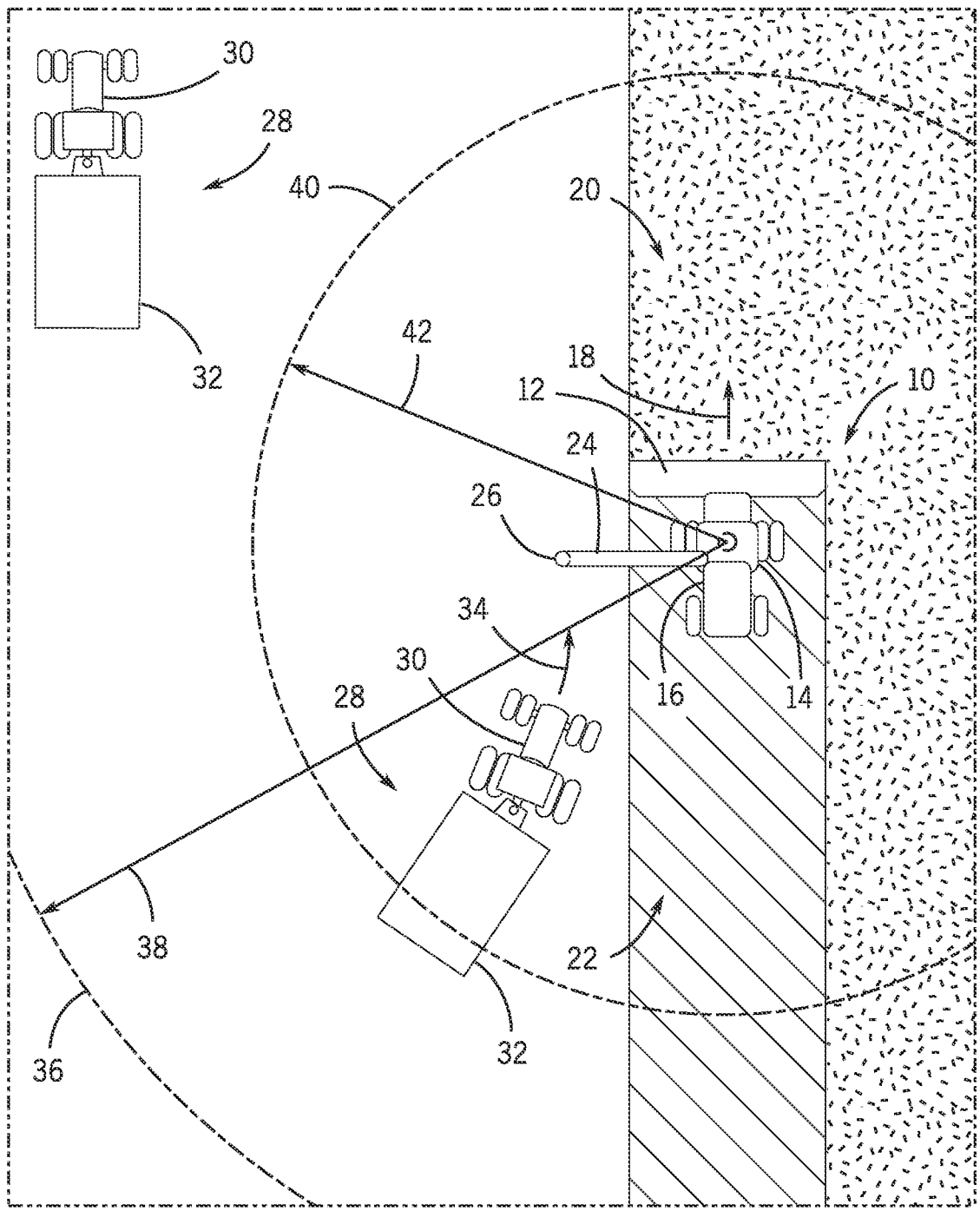
FIG. 1 is a top view of an embodiment of an agricultural harvester and an agricultural product transportation system, in which the agricultural product transportation system is configured to automatically dock with the agricultural harvester, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header. In addition, the harvester may convey the usable material of the harvested crops to an internal storage component (e.g., a compartment). As the harvester traverses the field, the quantity of harvested crops increases. Eventually, the internal storage component may reach capacity and prevent further harvesting from taking place. Accordingly, the internal storage component is typically unloaded repeatedly during operation of the harvester. One method of unloading, generally known as the on-the-go method, involves periodically transferring the contents of the internal storage component to a mobile storage compartment that is towed by a haul vehicle. This transfer may occur while the harvester operates, thereby enabling continual harvester operation without stoppages for transfer. Once the transfer of the crops from the internal storage component to the mobile storage compartment is complete, the crops are typically towed to a storage location by the haul vehicle to be unloaded. During transfer operations, the haul vehicle travels back and forth between the storage location and the harvester to continually unload the internal storage component and transfer crops to the storage location. Certain haul vehicles include a control system configured to automatically direct the haul vehicle to a position that aligns the mobile storage compartment with a conveyor outlet of the harvester. The control system may periodically receive data pertaining to the harvester heading, speed, and location, and utilize the data to generate a haul path for the haul vehicle to follow to align the mobile storage compartment with the conveyor outlet of the harvester. However, due to latency associated with communicating the data to the control system, the data the control system receives may be outdated. Accordingly, the haul path may be inaccurate, thereby resulting in one or more path redeterminations.

The present disclosure is directed to a control system for a haul vehicle configured to receive a primary path for a harvester and/or a number of duplicate paths. For example, the primary path may be a path generated for a harvester to follow while harvesting crops along a row at the edge of a field. The duplicate paths may be a number of additional paths geometrically identical to the primary path and offset from the primary path. One or more harvesters may follow the duplicate paths to harvest crops from rows offset from the primary path. The control system may receive data indicating the location of a harvester. The control system may utilize the duplicate paths (e.g., received by the control system or determined by the control system based on the primary path) and the harvester location data to determine which duplicate path the harvester is traversing. Using this data, the control system may generate a working path for positioning the haul vehicle alongside the harvester, thereby generating an accurate working path while reducing repeat determinations (e.g., as compared to periodically re-determining a path based on updated data).

With this in mind, FIG. 1 is a top view of an embodiment of an agricultural harvester and an agricultural product transportation system, in which the agricultural product transportation system is configured to automatically dock with the agricultural harvester. In the illustrated embodiment, an agricultural harvester 10 (e.g., target vehicle) includes a row of harvesting units 12 (e.g., header) positioned on a front end of a chassis 14 and an internal storage compartment 16 coupled to the chassis 14. As the agricultural harvester 10 traverses a field along a direction of travel 18, the harvesting units 12 engage unharvested plants 20 and extract various agricultural products (e.g., corn, wheat, cotton, etc.) from the plants. These agricultural products are transferred to the internal storage compartment 16, either directly or via a processing device configured to remove undesirable portions of the agricultural products. The remaining portions of the plants remain in the field as agricultural residue 22.

As the harvester 10 traverses the field, the volume of agricultural product stored within the internal storage compartment 16 increases. Accordingly, the harvester 10 includes a conveyor 24 configured to transfer the agricultural product to a mobile storage compartment while the harvester is in motion. The conveyor 24 may include an auger, a conveyor belt, or another suitable device configured to transfer the agricultural product from the internal storage compartment 16 to an outlet 26. As discussed in detail below, the mobile storage compartment may be automatically aligned with the conveyor outlet 26, thereby enhancing the efficiency of the harvester unloading process. While the illustrated agricultural harvester 10 is a self-propelled vehicle, in certain embodiments, the agricultural harvester may be towed behind a tractor or other work vehicle. In addition, while the illustrated agricultural harvester 10 includes an internal storage compartment 16, the internal storage compartment may be omitted in certain harvester configurations. In such configurations, the harvester may continuously transfer agricultural product to the mobile storage compartment as the harvester extracts and processes the agricultural products.

In the illustrated embodiment, an agricultural product transportation system 28 is configured to receive the agricultural product from the harvester 10. As illustrated, the agricultural product transportation system 28 includes a haul vehicle 30 (e.g., work vehicle), such as the illustrated tractor, and a mobile storage compartment 32 (e.g., grain cart). The haul vehicle 30 includes a controller configured to automatically direct the haul vehicle along a route 34 to a target position proximate to the harvester 10. For example, the controller may automatically control the haul vehicle 30 during a docking process, thereby positioning the storage compartment in a location that enhances the transfer efficiency of the agricultural product from the harvester to the storage compartment. In certain embodiments, the controller is configured to determine a plurality of paths the agricultural harvester 10 may travel along, determine an active path that the agricultural harvester 10 is currently traversing, generate a path for the haul vehicle 30 to follow for aligning the storage compartment 32 with the conveyor outlet 26, and control the haul vehicle to follow the path. While the storage compartment 32 is towed by the haul vehicle 30 in the illustrated embodiment, in other embodiments, the storage compartment may be rigidly coupled to the haul vehicle (e.g., such that the storage compartment forms a portion of the haul vehicle). Because the controller automatically maintains the position of the storage compartment relative to the conveyor outlet during the unloading process, the possibility of agricultural product loss is substantially reduced or eliminated, thereby increasing the efficiency of the harvesting process.

By way of example, when the haul vehicle 30 enters an area of communication 36, communication is automatically established between a first transceiver on the haul vehicle 30 and a second transceiver on the harvester 10. The controller of the haul vehicle detects the harvester upon receiving a signal from the harvester transceiver, and the controller of the harvester detects the haul vehicle upon receiving a signal from the haul vehicle transceiver. A range 38 of the area of communication 36 may be dependent on the broadcast power of the transceivers, the sensitivity of the transceivers, the communication frequency, other suitable factor(s), or a combination thereof. In certain embodiments, each transceiver is configured to transmit data at a fixed interval (e.g., 50 Hz, 20 Hz, 10 Hz, 5 Hz, 1 Hz, 0.5 Hz, 0.1 Hz, etc.). The data may include a location of the haul vehicle/harvester, a speed of the haul vehicle/harvester, a heading of the haul vehicle/harvester, an identity of the haul vehicle/harvester, other parameter(s), or a combination thereof. In addition, each transceiver may be configured to retransmit data received from another transceiver. For example, the haul vehicle closer to the harvester may receive a signal from the harvester, and then retransmit the signal to the haul vehicle farther from the harvester, thereby effectively extending the communication range of each transceiver.

To initiate the docking process, the controller determines a path that the agricultural harvester traverses, generates a path for the haul vehicle 30 to follow, and controls the haul vehicle 30 to follow the path to align the storage compartment 32 with the conveyor outlet 26. The controller of the haul vehicle 30 may receive or generate a plurality of paths in the field that the agricultural harvester 10 may traverse. The controller receives data indicative of the location, speed, and heading of the agricultural harvester 10, and utilize the data to determine which path of the plurality of paths the agricultural harvester 10 is currently traversing. The controller generates a path for the haul vehicle 30 to follow for the docking process, and controls the haul vehicle 30 (including the direction and speed of the haul vehicle 30) to align the storage compartment 32 with the conveyor outlet 26.

Figure 2:
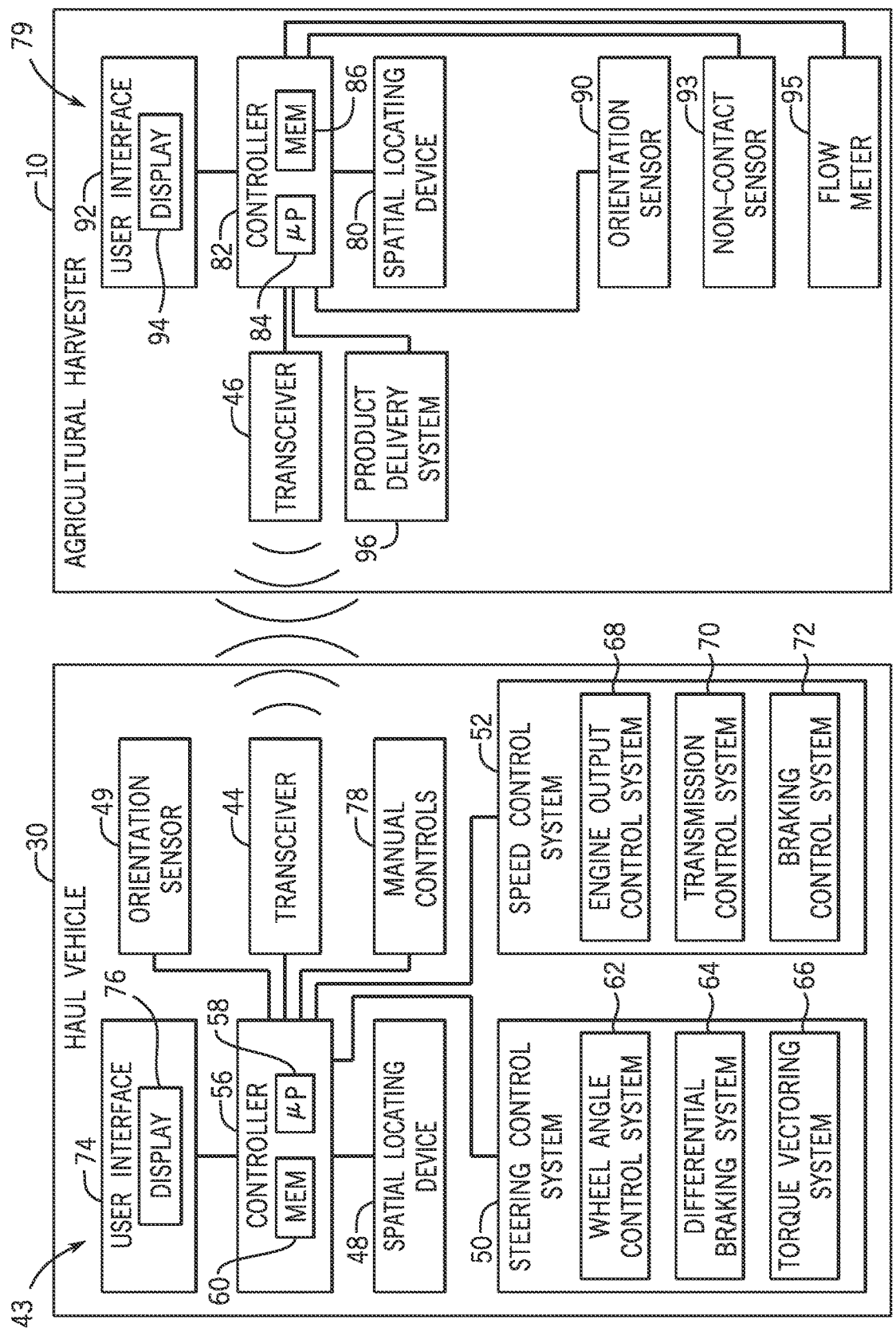
FIG. 2 is a schematic diagram of an embodiment of an agricultural harvester and a haul vehicle, which may be employed within the agricultural product transportation system of FIG. 1, in accordance with an aspect of the present disclosure.

FIG. 2 is a schematic diagram of an embodiment of an agricultural harvester 10 and a haul vehicle 30, which may be employed within the agricultural product transportation system of FIG. 1. In the illustrated embodiment, the haul vehicle 30 includes a control system 43 having a first transceiver 44 configured to receive a first signal from a second transceiver 46 of the agricultural harvester 10. The first signal may be indicative of location, speed, and heading data of the agricultural harvester 10. The first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, cellular, etc.) or a proprietary protocol.

The haul vehicle control system 43 also includes a spatial locating device 48, which is mounted to the haul vehicle 30 and configured to output a signal indicative of position, heading, and speed of the haul vehicle 30. The spatial locating device may include any suitable system configured to measure the position and, in certain embodiments, velocity of the haul vehicle, such as a global positioning system (GPS), for example. In certain embodiments, the spatial locating device 48 may be configured to measure the position and, in certain embodiments, velocity of the haul vehicle relative to a fixed point within a field (e.g., via a fixed radio transceiver). Accordingly, the spatial locating device 48 may be configured to measure the position and, in certain embodiments, velocity of the haul vehicle relative to a fixed global coordinate system (e.g., via the GPS) or a fixed local coordinate system. Furthermore, in certain embodiments, the spatial locating device 48 may be configured to measure the position and, in certain embodiments, velocity of the haul vehicle relative to the harvester (e.g., to establish a moving local coordinate system). The signal from each haul vehicle may be utilized to determine which vehicle is closest to the harvester, thereby enabling the closest haul vehicle to dock with the harvester while the remaining vehicles wait for a subsequently unloading cycle.

In addition, the haul vehicle control system 43 includes an orientation sensor 49 configured to output a signal indicative of a pitch angle, a yaw angle, a roll angle, or a combination thereof, of the haul vehicle. For example, the orientation sensor 49 may include a gyroscope or other sensor configured to monitor the orientation of the haul vehicle 30. In certain embodiments, the orientation sensor 49 is also configured to output a signal indicative of a pitch rate, a yaw rate, a roll rate, or a combination thereof. Furthermore, in certain embodiments, the haul vehicle control system 43 is configured to compare the orientation (e.g., pitch angle, yaw angle, roll angle) of the haul vehicle 30 to a measured orientation (e.g., pitch angle, yaw angle, roll angle) of the harvester 10 to establish a relative orientation that may be utilized to enhance the accuracy of the docking process. While the haul vehicle control system includes an orientation sensor 49 in the illustrated embodiment, in other embodiments, the orientation sensor may be omitted.

In the illustrated embodiment, the control system 43 includes a steering control system 50 configured to control a direction of movement of the haul vehicle 30, and a speed control system 52 configured to control a speed of the haul vehicle 30. In addition, the control system 43 includes a controller 56 communicatively coupled to the first transceiver 44, to the spatial locating device 48, to the steering control system 50, and to the speed control system 52. The controller 56 is configured to automatically control the haul vehicle 30 during docking and while docked with the harvester, thereby enhancing transfer efficiency of the agricultural product to the storage compartment. In certain embodiments, the controller 56 is configured to determine a path to the target position based at least in part on the current location of the haul vehicle and the path of the agricultural harvester. Once the path is determined, the controller is configured to control the steering control system and the speed control system to direct the haul vehicle along the path. Upon substantially reaching the target position, the controller is configured to control the steering control system and the speed control system to substantially maintain alignment relative to the agricultural harvester. In certain embodiments, the haul vehicle controller 56 may control the haul vehicle to substantially align the unloading point with the conveyor outlet of the harvester, thereby facilitating efficient transfer of agricultural product from the harvester to the storage compartment.

In certain embodiments, the controller 56 is also configured to determine a distance between the haul vehicle and the harvester based on the current position of the haul vehicle relative to the harvester. If the distance is less than or equal to the engagement distance, the controller 56 is configured to enable automatic control of the haul vehicle. Otherwise, the automatic control is disabled. In certain embodiments, upon detection of a separation distance less than or equal to the engagement distance, the controller 56 is configured to instruct a user interface to present an indication to an operator that automatic control is enabled. The operator may then initiate automatic control (e.g., via the user interface), thereby instructing the controller to direct the haul vehicle along the path.

In certain embodiments, the controller 56 is an electronic controller having electrical circuitry configured to process data from the transceiver 44, the spatial locating device 48, other components of the control system 43, or a combination thereof. In the illustrated embodiment, the controller 56 includes a processor, such as the illustrated microprocessor 58, and a memory device 60. The controller 56 may also include one or more storage devices and/or other suitable components. The processor 58 may be used to execute software, such as software for controlling the haul vehicle 30, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as read-only memory (ROM). The memory device 60 may store a variety of information and may be used for various purposes. For example, the memory device 60 may store processor-executable instructions (e.g., firmware or software) for the processor 58 to execute, such as instructions for controlling the haul vehicle 30. The storage device(s) (e.g., nonvolatile storage) may include ROM, flash memory, a hard drive, or any other suitable optical, magnetic, or solid-state storage medium, or a combination thereof. The storage device(s) may store data (e.g., location data, identification data, etc.), instructions (e.g., software or firmware for controlling the haul vehicle, etc.), and any other suitable data.

In the illustrated embodiment, the steering control system 50 includes a wheel angle control system 62, a differential braking system 64, and a torque vectoring system 66. The wheel angle control system 62 may automatically rotate one or more wheels and/or tracks of the haul vehicle (e.g., via hydraulic actuators) to steer the haul vehicle along a target route. By way of example, the wheel angle control system 62 may rotate front wheels/tracks, rear wheels/tracks, intermediate wheels/tracks, or a combination thereof, of the haul vehicle (e.g., either individually or in groups). The differential braking system 64 may independently vary the braking force on each lateral side of the haul vehicle to direct the haul vehicle along a target route. In addition, the torque vectoring system 66 may differentially apply torque from an engine to wheel(s) and/or track(s) on each lateral side of the haul vehicle, thereby directing the haul vehicle along a target route. While the illustrated steering control system 50 includes the wheel angle control system 62, the differential braking system 64, and the torque vectoring system 66, other embodiments may include one or two of these systems, in any suitable combination. In further embodiments, the steering control system may include other and/or additional systems (e.g., an articulating steering system in which a front portion of the haul vehicle articulates relative to a rear portion of the haul vehicle, etc.) to facilitate directing the haul vehicle along a target route.

In the illustrated embodiment, the speed control system 52 includes an engine output control system 68, a transmission control system 70, and a braking control system 72. The engine output control system 68 is configured to vary the output of the engine to control the speed of the haul vehicle. For example, the engine output control system 68 may vary a throttle setting of the engine, a fuel/air mixture of the engine, a timing of the engine, other suitable engine parameters, or a combination thereof, to control engine output. In addition, the transmission control system 70 may adjust a gear ratio within a transmission (e.g., by adjusting gear selection in a transmission with discrete gears, by controlling a continuously variable transmission (CVT), etc.) to control the speed of the haul vehicle. Furthermore, the braking control system 72 may adjust braking force, thereby controlling the speed of the haul vehicle 30. While the illustrated speed control system 52 includes the engine output control system 68, the transmission control system 70, and the braking control system 72, other embodiments may include one or two of these systems, in any suitable combination. In further embodiments, the speed control system may include other and/or additional systems (e.g., an electric motor controller for an electric motor, etc.) to facilitate adjusting the speed of the haul vehicle.

In the illustrated embodiment, the haul vehicle control system 43 includes a user interface 74 communicatively coupled to the controller 56. The user interface 74 is configured to selectively instruct the controller 56 to automatically control the haul vehicle based on operator input. For example, the operator may position the haul vehicle within the area of engagement, and then activate the automatic docking process via input to the user interface 74. In certain embodiments, the user interface includes a display 76 configured to present information to the operator, such as whether the haul vehicle is within the area of communication, whether the haul vehicle is within the area of engagement, and whether conditions for automatic docking have been satisfied, among other parameters.

As illustrated, the haul vehicle 30 includes manual controls 78 configured to enable an operator to control the haul vehicle while the automatic control system is disengaged. The manual controls 78 may include manual steering control, manual transmission control, manual braking control, other suitable controls, or a combination thereof. In the illustrated embodiment, the manual controls 78 are communicatively coupled to the controller 56. The controller 56 is configured to disengage automatic control of the haul vehicle upon receiving a signal indicative of manual control of the haul vehicle. Accordingly, if an operator controls the haul vehicle manually, the automatic docking/docked process terminates, thereby restoring control of the haul vehicle to the operator. While the haul vehicle includes manual controls in the illustrated embodiment, in other embodiments (e.g., in embodiments in which the haul vehicle is remotely controlled, in embodiments in which the haul vehicle is fully automated, etc.), the manual controls may be omitted.

In the illustrated embodiment, the harvester 10 includes a control system 79 having a spatial locating device 80, which is mounted to the harvester 10 and configured to output a signal indicative of the location, heading, and speed of the agricultural harvester 10. The harvester spatial locating device 80 may include any suitable system configured to measure the position, and in certain embodiments, velocity of the harvester, such as a global positioning system (GPS), for example. In certain embodiments, the spatial locating device 80 may be configured to measure the position and, in certain embodiments, velocity of the harvester relative to a fixed point within a field (e.g., via a fixed radio transceiver). Accordingly, the spatial locating device 80 may be configured to measure the position and, in certain embodiments, velocity of the harvester relative to a fixed global coordinate system (e.g., via the GPS) or a fixed local coordinate system. As illustrated, the spatial locating device 80 is communicatively coupled to a controller 82 of the harvester control system 79. The harvester controller 82 includes a processor, such as the illustrated microprocessor 84, and a memory device 86. The controller 82 is communicatively coupled to the second transceiver 46 and configured to output location and, in certain embodiments, speed information from the spatial locating device 80 to the transceiver 46.

Furthermore, the orientation sensor 90 is configured to output a signal indicative of a measured pitch angle, a measured yaw angle, a measured roll angle, or a combination thereof, of the harvester. For example, the orientation sensor 90 may include a gyroscope or other sensor configured to monitor the orientation of the harvester 10. In certain embodiments, the orientation sensor 90 is also configured to output a signal indicative of a pitch rate, a yaw rate, a roll rate, or a combination thereof. As illustrated, the orientation sensor 90 is communicatively coupled to the controller 82. The controller 82 is configured to receive the signal indicative of the orientation measurements from the orientation sensor 90, and to output the signal to the transceiver 46. The transceiver 46, in turn, is configured to incorporate the orientation information into the first signal to the haul vehicle. The orientation information may enable the haul vehicle control system to more accurately predict the expected position of the harvester, thereby enhancing the efficiency of the docking process. The orientation information may also enable the haul vehicle control system to more accurately position the haul vehicle at the target position while the haul vehicle is docked with the harvester.

The harvester control system may include additional sensors configured to measure other parameters associated with operation of the harvester. For example, in certain embodiments, the harvester control system may include an electronic compass configured to output a signal indicative of heading. In further embodiments, the harvester control system may include an accelerometer configured to output a signal indicative of acceleration (e.g., three-dimensional acceleration) of the harvester. The output from such sensors may be incorporated within the first signal to the haul vehicle. While an electronic compass and an accelerometer are described above, in further embodiments the harvester control system may include other and/or additional suitable sensors.

In the illustrated embodiment, the harvester control system 79 includes a user interface 92 configured to receive input from an operator of the agricultural harvester. The user interface 92 includes a display 94 configured to present information to the harvester operator and/or to receive input from the operator. As illustrated, the user interface 92 is communicatively coupled to the controller 82.

In the illustrated embodiment, the harvester control system 79 includes a non-contact sensor 93 communicatively coupled to the controller 82. In certain embodiments, the non-contact sensor 93 (e.g., including a camera, infrared sensor, light detection and ranging (LIDAR) sensor, radio detection and ranging (RADAR) sensor, ultrasonic sensor, etc.) is coupled to the conveyor (e.g., at the outlet) and configured to be directed toward the storage compartment. In certain embodiments (e.g., embodiments in which the non-contact sensor includes a camera or infrared sensor), the non-contact sensor 93 is configured to output a signal to the controller 82 indicative of an image or series of images of the storage compartment. The controller 82, in turn, is configured to output a corresponding signal to the user interface 92, which directs the display 94 to present one or more visual images of the storage compartment to the operator. The non-contact sensor 93 may be communicatively coupled directly to the user interface 92 in certain embodiments.

In certain embodiments (e.g., embodiments in which the non-contact sensor includes a LIDAR sensor, a RADAR sensor, or an ultrasonic sensor), the controller 82 may be configured to generate one or more images based on the signal output by the non-contact sensor. For example, the controller 82 may be configured to establish a three-dimensional model of a portion of the storage compartment based on the signal, and to output a signal to the user interface 92 indicative of one or more views (e.g., top view, perspective view, etc.) of the three-dimensional model. The display 94 of the user interface 92, in turn, may present the views to the operator, thereby assisting the operator in identifying alignment of the conveyor outlet with the first and second points on the storage compartment.

Furthermore, in certain embodiments, the controller 82 may determine a level and/or a profile of the agricultural product within the storage compartment based on feedback from the non-contact sensor. Additionally or alternatively, the controller 82 may determine a flow rate of the agricultural product from the conveyor to the storage compartment based on the feedback from the non-contact sensor. For example, the controller 82 may determine a level of the agricultural product within the storage compartment at a first time, determine a level of the agricultural product within the storage compartment at a second time, and determine the flow rate based on the change in level and the time difference. While the non-contact sensor 93 is coupled to the conveyor (e.g., the outlet of the conveyor) in the illustrated embodiment, in other embodiments, the non-contact sensor 93 may be mounted to the storage compartment, to the haul vehicle, or to another suitable portion of the harvester. In embodiments in which the non-contact sensor is mounted to the haul vehicle or the storage compartment, the non-contact sensor may be communicatively coupled to the harvester controller via the transceivers and the haul vehicle controller.

In the illustrated embodiment, the harvester control system 79 includes a flow meter 95 communicatively coupled to the controller 82. The flow meter 95 is configured to output a signal indicative of a flow rate of the agricultural product through the conveyor. The flow meter 95 may include any suitable type of sensor configured to monitor the flow rate of the agricultural product, such as an optical sensor or a capacitive sensor. For example, in certain embodiments, the flow meter may include a wheel positioned within the flow path of the agricultural product through the conveyor and a counter configured to output a signal indicative of the number of rotations of the wheel/speed of the wheel. Furthermore, in certain embodiments, the flow meter may include a sensor configured to monitor a speed of an auger or a belt of the conveyor. While the harvester control system 79 includes the non-contact sensor 93 and the flow meter 95 in the illustrated embodiment, in other embodiments, the non-contact sensor and/or the flow meter may be omitted.

In the illustrated embodiment, the agricultural harvester 10 includes a product delivery system 96 (e.g., including a belt or an auger of the conveyor) configured to transfer agricultural product from the harvester to the storage compartment. As illustrated, the product delivery system 96 is communicatively coupled to the controller 82. In certain embodiments, the controller 82 is configured to engage product flow from the conveyor outlet to the storage compartment (e.g., via activation of the product delivery system 96) while (e.g., only while) the conveyor outlet is aligned at a target point within the storage compartment. In addition, the controller 82 may terminate product flow from the conveyor outlet to the storage compartment (e.g., via deactivation of the product delivery system 96) while the position of the conveyor outlet is misaligned with the target point.

In certain embodiments, the operator of the agricultural harvester may override the automatic control of the product flow. For example, the user interface 92 may include/present a product flow engagement input (e.g., button, switch, etc.) and a product flow termination input (e.g., button, switch, etc.). Engaging the product flow engagement input (e.g., depressing a product flow engagement button) causes the user interface 92 to output a signal to the controller 82 indicative of product flow engagement. The controller 82, in turn, may engage product flow from the conveyor outlet to the storage compartment in response to receiving the signal, even though the position of the conveyor outlet is misaligned with the target point. In addition, engaging the product flow termination input (e.g., depressing a product flow termination button) causes the user interface 92 to output a signal to the controller 82 indicative of product flow termination. The controller 82, in turn, may terminate product flow from the conveyor outlet to the storage compartment in response to receiving the signal, even though the position of the conveyor outlet is aligned with the target point.

Furthermore, in certain embodiments, the controller 82 is configured to output a signal to the user interface 92 indicative of conveyor outlet misalignment in response to the position of the conveyor outlet moving away from the target point. For example, the user interface 92 may present a visual (e.g., via the display 94) and/or an audible notification that the conveyor outlet is misaligned with the target point, thereby informing the operator of the misalignment. Upon receiving such a notification, the operator may manually correct the misalignment.

As discussed above, the present embodiments are directed to a control system for generating a path for aligning a haul vehicle alongside a harvester. For example, during operation of the harvester, a control system of the harvester may generate a primary path for a harvester to follow along a far edge of a field. The control system of the harvester may also generate or receive one or more duplicate paths. The duplicate paths may be geometrically identical to the primary path, and may be evenly spaced from the primary path to guide the harvester along rows of the field. A control system of the haul vehicle may receive the primary path and receive or generate the duplicate paths. The control system of the haul vehicle may also receive data indicative of the location of the harvester. The haul control system may analyze the data to identify which duplicate path the harvester is traversing. The haul controller may then generate a haul path for aligning the haul vehicle with the harvester.

Figure 3:
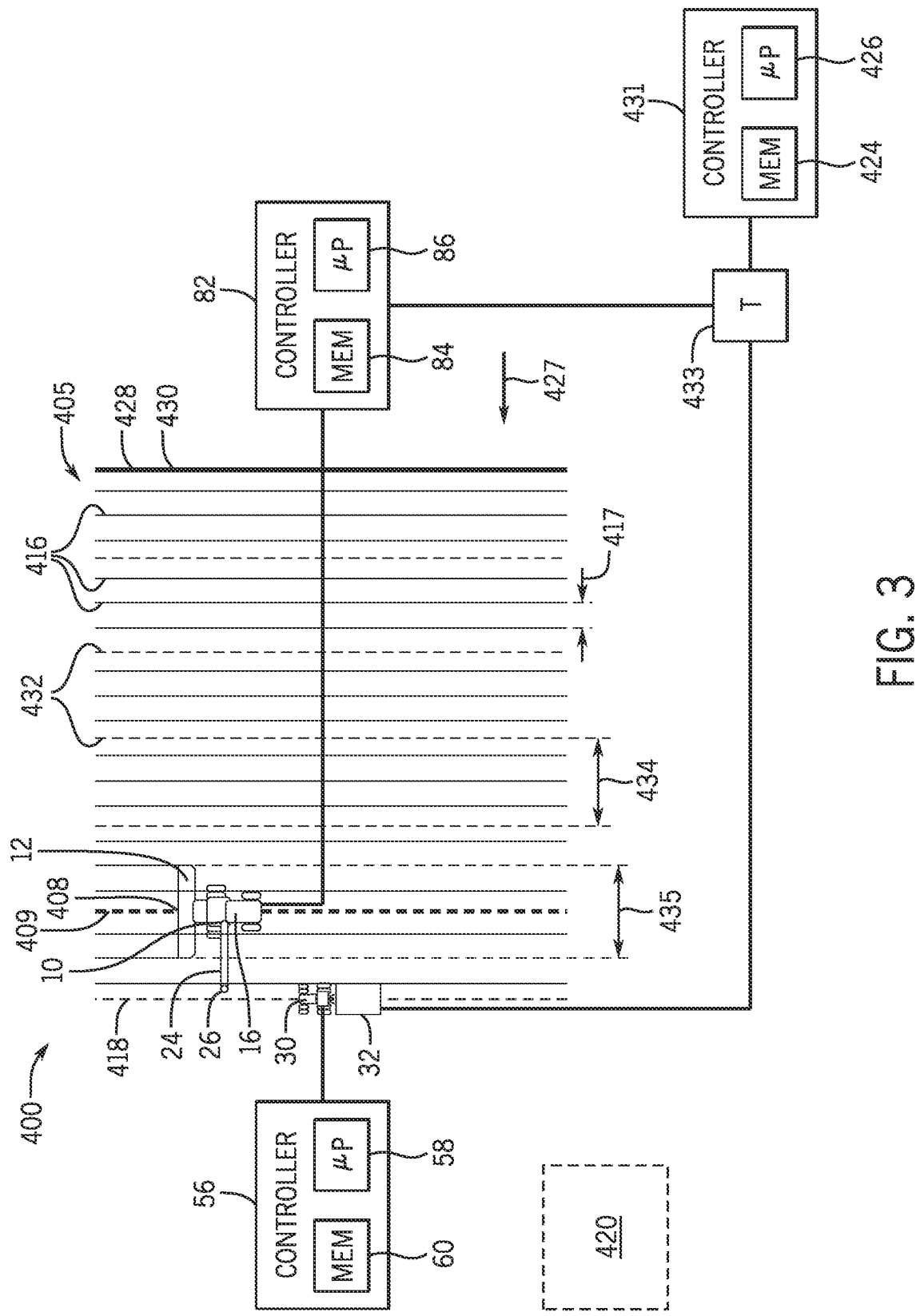
FIG. 3 is a schematic diagram of an embodiment of a system for generating one or more displaced paths for an agricultural harvester and a work path for a haul vehicle, in accordance with an aspect of the present disclosure.

With this in mind, FIG. 3 is a schematic diagram of an embodiment of a system 400 (e.g., an agricultural system) for generating one or more duplicate paths for an agricultural harvester and a work path for a haul vehicle. The system 400 includes the agricultural harvester 10 (e.g., target vehicle) configured to harvest crops and the haul vehicle 30 (e.g., work vehicle) towing the storage compartment 32 within a field 405. The agricultural harvester 10 is configured to harvest crops (e.g., corn, wheat, cotton, canola, etc.) while traveling along an active path 408 (e.g., a work path, a current path, etc.) of harvester paths 409. As previously discussed, during operation, the agricultural harvester 10 may collect harvested crops in an internal storage compartment 16. As the internal storage compartment 16 reaches capacity, the agricultural harvester 10 may unload the harvested crops to the storage compartment 32 via the conveyor 24. In certain embodiments, the harvesting operation of system 400 may utilize target vehicles and work vehicles other than the agricultural harvester 10 and the haul vehicle 30.

The agricultural harvester 10 may harvest crops by directing the header 12 over unharvested crops along the harvester paths 409. In general, crops are planted in multiple rows. In certain fields, each row is planted as to have substantially the same geometry as every other row within the field. That is, each row is dimensionally similar to every other row. In some cases, a field of crops may include multiple geometrically similar rows spaced evenly apart from one another. Accordingly, the harvester paths may follow the geometry of the rows during harvesting. In this way, a harvester may harvest crops by making multiple passes through the field, following geometrically similar, evenly spaced, and adjacent harvester paths, until a desired amount of crop is harvested. Each pass may harvest one or more rows of crops. In certain embodiments, a single harvester may make multiple passes to harvest a field. In other embodiments, multiple harvesters may concurrently operate to expedite the harvesting process, and each harvester may follow the harvester paths through the field. In the present disclosure, the agricultural harvester 10 may harvest crops by following harvester paths 409, and each harvester path may correspond to one or more crop rows 416. That is, by traveling along the harvester paths 409, the agricultural harvester 10 may harvest crops in the crop rows 416 via the header 12. Each crop row 416 may be spaced substantially evenly by a distance 417.

During operation, the agricultural harvester 10 may harvest a quantity of crops sufficient to fill the internal storage compartment 16. The internal storage compartment 16 may have a limited capacity to hold harvested crops. Accordingly, the agricultural harvester 10 may periodically unload the contents of the internal storage compartment 16 via the conveyor 24. The conveyor 24 may transport the harvested crops from the internal storage compartment 16 to the mobile storage compartment 32. The mobile storage compartment 32 may be a wheeled vehicle including an open-topped container configured to receive crops from above. The storage compartment 32 may be towed by the haul vehicle 30 and store crops while in transit. For example, the haul vehicle 30 may haul the storage compartment 32 beside the agricultural harvester 10 along a haul path 418 (e.g., a work path). During a transfer operation, the storage compartment 32 may receive crops from the conveyor 24. The haul vehicle 30 may haul the storage compartment 32 away from the agricultural harvester 10 toward a storage area 420 once the storage compartment 32 has reached a desired fill level. In certain embodiments, the storage area 420 may be an area for long-term storage (e.g., a silo). In other embodiments, the storage area 420 may be a temporary storage area.

The harvesting operation of the system 400 may be performed automatically. The agricultural harvester 10 may be controlled by the harvester controller 82 (e.g., a target vehicle controller). As previously discussed, the harvester controller 82 is configured to control operation of the agricultural harvester 10 and output data, such as speed and vehicle heading, to the haul vehicle 30. By way of example, the harvester controller 82 may be located in a cab of the agricultural harvester 10, or the harvester controller, or any element of the harvester controller, may be located at any other suitable position within the system 400. In other embodiments, the harvesting operation may be performed manually by one or more operators.

The harvester controller 82 or an operator may automatically control the agricultural harvester 10 during operation. The harvester controller 82 may operate the agricultural harvester 10 to follow a primary path 428 (e.g., swath, way line, etc.) for the field 405. The primary path 428 may be located along a row of the rows 416. In certain embodiments, the primary path 428 may align with a row located at an edge of the field 405, for example the edge row 430. In other embodiments, the primary path 428 may align with a row that is not located on an edge of the field (i.e., a row with adjacent rows on each side). In further embodiments, the primary path may be situated between two of the rows 416. The primary path 428 may be represented by a data set indicative of a continuous curve (e.g., a spline, a clothoid, etc.). The data set may include geographically linked points (e.g., coordinates), interpolated lines between the points, parameters of a formula (e.g., spline formula, clothoid formula, etc.) that establishes the continuous curve, other suitable data, or a combination thereof. In certain embodiments, the harvester controller 82 may generate/determine the primary path 428. In other embodiments, an external controller 431 may generate/determine the primary path 428 (e.g., based user input, external data, one or more field maps, etc.) and output the primary path 428 to the harvester controller 82 via a transmitter 433. The external controller 431 and transmitter 433 may be located external to the vehicles of system 400 (e.g., in a control building, in a mobile device, etc.).

The external controller 431 includes a processor, such as the illustrated microprocessor 424, and a memory device 426. The external controller 431 may also include one or more storage devices and/or other suitable components. The processor 424 may be used to execute software, such as software for controlling the haul vehicle 30, and so forth. Moreover, the processor 424 may include multiple microprocessors, one or more "general-purpose" microprocessors, one or more special-purpose microprocessors, and/or one or more application specific integrated circuits (ASICS), or some combination thereof. For example, the processor 424 may include one or more reduced instruction set (RISC) processors.

The memory device 426 may include a volatile memory, such as random access memory (RAM), and/or a nonvolatile memory, such as read-only memory (ROM). The memory device 426 may store a variety of information and may be used for various purposes. For example, the memory device 426 may store processor-executable instructions (e.g., firmware or software) for the processor 424 to execute, such as instructions for controlling the haul vehicle 30. The storage device(s) (e.g., nonvolatile storage) may include ROM, flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data.

The harvester controller 82 may control the agricultural harvester 10 to traverse the primary path 428. The harvester controller 82 may also control the agricultural harvester 10 to traverse each duplicate path 432 of a set of duplicate paths 432. The duplicate paths 432 (e.g., vehicle paths) may be geometrically identical to the primary path 428 and evenly spaced along an axis or direction 427 of the field 405. The harvester controller may generate a duplicate path 432 in the same location as the primary path 428 and evenly space the remaining duplicate paths 432 along the direction 427. The duplicate paths 432 may be spaced from one another by the distance 434. In certain embodiments, the distance 434 between the duplicate paths 432 may be substantially equal to a width 435 of the header 12. Accordingly, the duplicate paths 432 may be spaced to place all crops of the rows 416 in the path of the header 12 during operation. Each duplicate path 432 may have a direction the agricultural harvester 10 is configured to travel along. For example, the agricultural harvester 10 may be configured to travel in a north-south direction along a first duplicate path, and the agricultural harvester 10 may be configured to travel in a south-north direction along an adjacent duplicate path. In certain embodiments, the harvester controller may direct the agricultural harvester 10 along each of the duplicate paths 432. In other embodiments, the agricultural harvester 10 may travel along one or more duplicate paths 432 concurrently with other harvesters traveling along other duplicate paths 432. Furthermore, in certain embodiments, the harvester controller 82 may generate/determine the duplicate paths 432. In other embodiments, the external controller 431 may generate/determine the duplicate paths 432 and output the duplicate paths 432 to the harvester controller 82 via the transmitter 433.

As previously discussed, the haul vehicle 30 may be controlled by a haul vehicle controller 56. The haul vehicle controller 56 may be configured to receive data and to control operation of the haul vehicle 30 (e.g., speed and vehicle heading). By way of example, the haul vehicle controller 56 may be located in a cab of the haul vehicle 30, or the haul vehicle controller, or any element of the haul vehicle controller, may be located at any other suitable position within the system 400.

The haul vehicle controller 56 may control the haul vehicle 30 to align with the agricultural harvester during the crop transfer operation. For example, the haul vehicle controller 56 may receive or determine the duplicate paths 432 (e.g., data describing the duplicate paths 432) as well as location, heading, and speed data of the agricultural harvester from the harvester controller 422. The haul vehicle controller 56 may utilize the location, heading, or speed data, or some combination thereof, to determine which of the duplicate paths 432 is being traversed by the agricultural harvester 10. For example, upon receiving location data and the duplicate paths 432, the haul vehicle controller may determine that the location of the agricultural harvester is proximate to/along a certain duplicate path 432. The haul vehicle controller may identify the certain duplicate path as an active path 408 (i.e., the path that the agricultural harvester 10 is traversing) of the harvester paths 409. Having determined the active path 408, the haul vehicle controller 56 may generate the haul path 418. The haul vehicle controller 56 may operate the haul vehicle 30 to traverse the haul path 418 to align the storage compartment 32 with the conveyor outlet 26. The haul vehicle controller 56 may maintain a heading and speed of the haul vehicle 30 during the unloading operation. In certain embodiments, the haul vehicle controller 56 may instruct the user interface to present the active path 408 and/or the haul path 418 on a display (e.g., the display 76). Operation of the haul vehicle 30 is discussed below.

Figure 4:
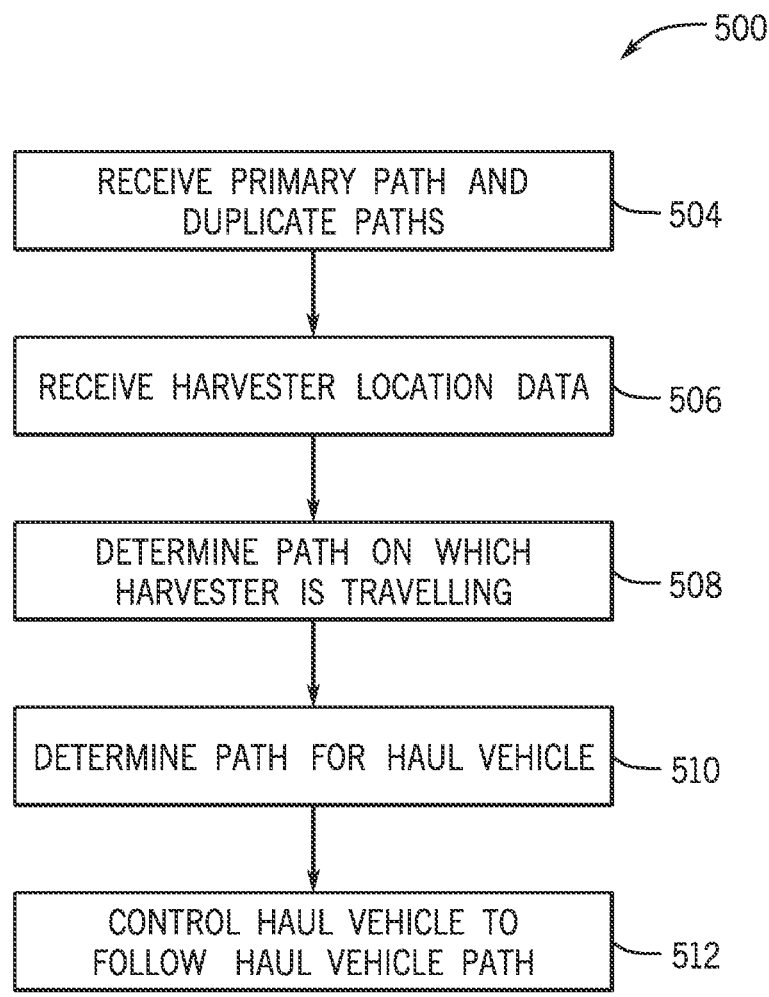
FIG. 4 is a flow diagram of an embodiment of a method for generating a path for a haul vehicle, in accordance with an aspect of the present disclosure.

FIG. 4 is a flow diagram of an embodiment of a method 500 for generating a path for a haul vehicle. The method 500 may be performed via the haul vehicle controller 56 disclosed above, or another suitable device(s). Further, the method 500 may be performed differently in additional or alternative embodiments. For instance, additional steps may be performed with respect to the method 500, and/or certain steps of the method 500 may be modified, removed, performed in a different order, or a combination thereof.

At block 504, data indicative of the duplicate paths is received. In certain embodiments, the data may be received from the harvester controller. In other embodiments, the data may be received from the external controller via the external transmitter. The data describing the duplicate paths may be represented by a data set indicative of a continuous curve (e.g., a spline, a clothoid, etc.). The data set may include geographically linked points (e.g., coordinates), interpolated lines between the points, parameters of a formula (e.g., spline formula, clothoid formula, etc.) that establishes the continuous curve, other suitable data, or a combination thereof. The data may be received via a Wi-Fi network, a 4G network, a 4G LTE network, a 5G network, a Bluetooth network, a near field communication (NFC) network, or any other suitable data communication system(s)/device(s). In certain embodiments, the haul vehicle controller may generate/determine the duplicate paths based on the primary path and the distance between the paths. In other embodiments, the haul vehicle controller may generate/determine the duplicate paths based on the primary path and the width of the header.

At block 506, location data of the agricultural harvester is received. The location data (e.g., target vehicle location data) may be received from the harvester controller. The data may include one or more coordinates. In certain embodiments, a single set of geographic coordinates representing a location of the agricultural harvester is received. In other embodiments, multiple coordinate sets with different time stamps are received. In further embodiments, coordinate data, time data, heading data, and speed data are received. The haul vehicle controller may also determine the speed and heading of the agricultural harvester using multiple coordinate sets with different time stamps. The data may be received via a Wi-Fi network, a 4G network, a 4G LTE network, a 5G network, a Bluetooth network, a near field communication (NFC) network, or any other suitable data communication system(s)/device(s). In some embodiments, the location data may be received once. In other embodiments, the location data may be periodically received.

At block 508, a determination is made regarding which path the agricultural harvester is traversing. The haul vehicle controller may utilize the data indicative of the duplicate paths and the location data to identify the duplicate path that is nearest to the location of the agricultural harvester, thereby identifying the active path. For example, the haul vehicle controller may utilize the coordinates received at block 506 to determine that the agricultural harvester is traversing a certain path (e.g., the active path) of the duplicate paths 432. In certain embodiments, the determination is made based on a single set of coordinates. In other embodiments, the determination is made based on multiple sets of coordinates. For example, the haul vehicle controller may determine a distance between each coordinate set of the sets of coordinates and each duplicate path. The haul vehicle controller may identify a duplicate path having a lowest average distance from the coordinate sets, thereby identifying the active path. The haul vehicle controller may also identify the active path based on the heading of the agricultural harvester and data indicating which direction each duplicate path is directed toward. The haul vehicle controller may also identify the primary path or a duplicate path sharing a location with the primary path as the active path.

At block 510, a haul vehicle path (e.g., a work path) is determined for the haul vehicle. For example, based on the identification of the active path, the haul vehicle controller may generate/determine a path (e.g., the haul vehicle path) to align the storage compartment with the conveyor outlet (e.g., while the haul vehicle is docked with the agricultural harvester). The haul vehicle path may be stored in the memory of the haul vehicle controller. The haul vehicle path may be updated if the location data indicates that the agricultural harvester has switched to another path.

At block 512, the haul vehicle is controlled to follow the haul vehicle path. For example, based on the location data received at block 506 and the haul vehicle path determined at block 510, the haul vehicle controller may control the haul vehicle to follow the haul vehicle path to align the storage compartment with the conveyor outlet (e.g., while the haul vehicle is docked with the agricultural harvester). The haul vehicle controller may control the speed of the haul vehicle as the haul vehicle traverses the haul vehicle path to maintain alignment between the storage compartment and the conveyor outlet.

Figure 5:
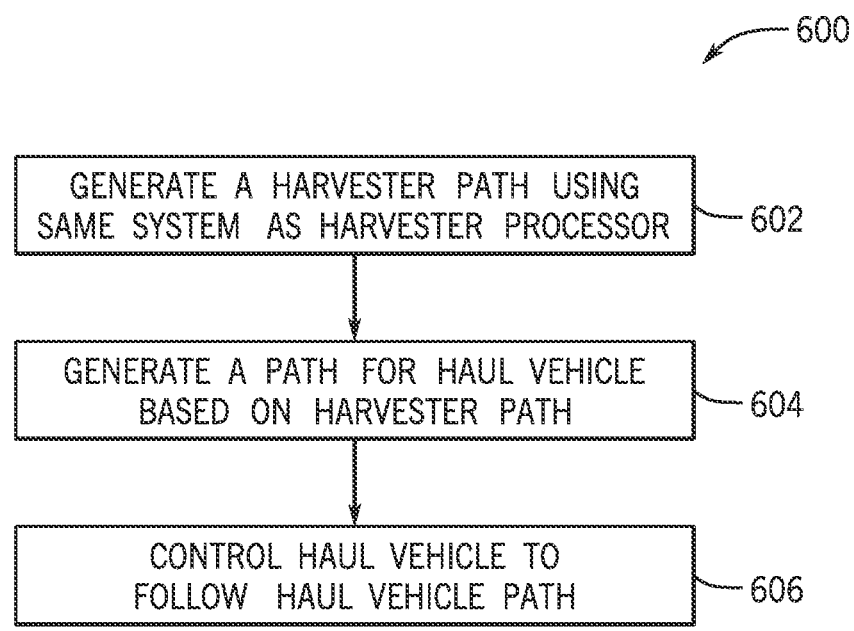
FIG. 5 is a flow diagram of an embodiment of a method for generating a harvester path and a haul vehicle path, in accordance with an aspect of the present disclosure.

FIG. 5 is a flow diagram of an embodiment of a method 600 for generating an active path and a haul vehicle path. The method 600 may be performed via the haul vehicle controller or the harvester controller disclosed above, or another suitable device(s). Further, the method 600 may be performed differently in additional or alternative embodiments. For instance, additional steps may be performed with respect to the method 600, and/or certain steps of the method 600 may be modified, removed, performed in a different order, or a combination thereof.

At block 602, an active path (e.g., target path) is determined at separate controllers. For example, the haul vehicle controller may execute software (e.g., code) to generate the active path. Separately, the harvester controller may execute identical software to independently generate the active path. The haul vehicle controller and the harvester controller may generate the active path via the method 500, by predicting the active path based on harvester location, heading, and speed data, or by another suitable method. Accordingly, the haul vehicle controller and the harvester controller may generate identical paths for the agricultural harvester. In certain embodiments, the active path may be generated by the external controller and output to the harvester controller and to the haul controller via the external transmitter. The haul vehicle controller may utilize the active path to determine a future location of the agricultural harvester.

At block 604, a haul vehicle path is determined for the haul vehicle to travel along to align with the target vehicle based on the active path determined at block 602. For example, based on the active path generated or received at block 602, the haul vehicle controller may generate a path (e.g., the haul vehicle path) to align the storage compartment with the conveyor outlet. The haul vehicle controller may control the speed of the haul vehicle as the haul vehicle traverses the haul vehicle path to maintain alignment between the storage compartment and the conveyor outlet.

At block 606, the haul vehicle is controlled to follow the haul vehicle path. For example, based on the location data of the agricultural harvester and the haul vehicle path determined at block 604, the haul vehicle controller may control the haul vehicle to follow the haul vehicle path to align the storage compartment with the conveyor outlet (e.g., while the haul vehicle is docked with the agricultural harvester). The haul vehicle controller may control the speed of the haul vehicle as the haul vehicle traverses the haul vehicle path to maintain alignment between the storage compartment and the conveyor outlet.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
a work vehicle controller comprising a memory and a processor, wherein the work vehicle controller is configured to:
receive or determine a plurality of duplicate paths for a target vehicle, wherein each duplicate path of the plurality of duplicate paths comprises a duplicate of a primary path of the target vehicle;
receive data indicative of a location of the target vehicle;
identify an active path of the plurality of duplicate paths based on the location of the target vehicle, wherein the active path is traversed by the target vehicle;
determine a work path for a work vehicle, wherein the work path comprises a path for aligning the work vehicle alongside the target vehicle; and
control the work vehicle to follow the work path.

2. The agricultural system of claim 1, wherein each duplicate path of the plurality of duplicate paths is represented as a spline or a clothoid.

3. The agricultural system of claim 1, wherein the work vehicle controller is configured to determine each vehicle duplicate path of the plurality of duplicate paths based on the primary path.

4. The agricultural system of claim 1, wherein the plurality of duplicate paths are spaced evenly away from the primary path along a direction, and a first duplicate path of the plurality of duplicate paths is in the same location as the primary path.

5. The agricultural system of claim 1, wherein the target vehicle comprises an agricultural harvester, the work vehicle comprises a haul vehicle configured to haul a storage compartment, and the target vehicle and work vehicle are configured to perform a crop unloading operation.

6. The agricultural system of claim 1, comprising receiving data indicative of a heading of the target vehicle, wherein the work vehicle controller is configured to identify the active path based on the location and the heading of the target vehicle.

7. The agricultural system of claim 1, wherein identifying the active path of the plurality of duplicate paths comprises comparing the location of the target vehicle to each duplicate path of the plurality of duplicate paths.

8. The agricultural system of claim 7, wherein identifying the active path of the plurality of duplicate paths comprises identifying which duplicate path of the plurality of duplicate paths is nearest to the location of the target vehicle.

9. A method, comprising:
receiving or determining, via a work vehicle controller comprising a memory and a processor, a plurality of duplicate paths for a target vehicle, wherein each duplicate path of the plurality of duplicate paths comprises a duplicate of a primary path of the target vehicle;
receiving, via the work vehicle controller, target vehicle location data, wherein the target vehicle location data comprises location data and heading data for the target vehicle;
identifying, via the work vehicle controller, an active path of the plurality of duplicate paths based on the target vehicle location data;
determining, via the work vehicle controller, a work path for a work vehicle, wherein the work path comprises a path for aligning the work vehicle alongside the target vehicle during an operation; and
controlling, via the work vehicle controller, the work vehicle to follow the work path.

10. The method of claim 9, comprising controlling, via the work vehicle controller, a speed of the work vehicle to maintain alignment alongside the target vehicle during the operation.

11. The method of claim 9, wherein identifying the active path of the plurality of duplicate paths comprises identifying which duplicate path of the plurality of duplicate paths is nearest to a coordinate of the target vehicle location data.

12. The method of claim 9, comprising determining, via the work vehicle controller, each duplicate path of the plurality of duplicate paths based on the primary path.

* * * * *